US012694472B2

(12) United States Patent
Jamil et al.

(10) Patent No.: US 12,694,472 B2
(45) Date of Patent: Jul. 28, 2026

(54) SYSTEMS AND METHODS OF OPTIMIZED DEEP LEARNING FOR IMAGE RECONSTRUCTION

(71) Applicant: CYENS CoE, Nicosia (CY)

(72) Inventors: Asfa Jamil, Nicosia (CY); Alessandro Artusi, Nicosia (CY)

(73) Assignee: CYENS CoE, Nicosia (CY)

( * ) Notice: Subject to any disclaimer, the term of this patent is extended or adjusted under 35 U.S.C. 154(b) by 534 days.

(21) Appl. No.: 18/172,640

(22) Filed: Feb. 22, 2023

(65) Prior Publication Data

US 2024/0281927 A1 Aug. 22, 2024

(51) Int. Cl.
| | |
|---|---|
| *G06T 3/4053* | (2024.01) |
| *G06N 3/045* | (2023.01) |
| *G06N 3/0464* | (2023.01) |
| *G06T 3/4046* | (2024.01) |

(52) U.S. Cl.
CPC ........... *G06T 3/4053* (2013.01); *G06N 3/045* (2023.01); *G06N 3/0464* (2023.01); *G06T 3/4046* (2013.01)

(58) Field of Classification Search
CPC .... G06N 3/045; G06N 3/0455; G06N 3/0464; G06N 3/04; G06N 3/02–0985; G06T 3/4046; G06T 3/4053; G06T 2207/20081; G06T 2207/20084; G06T 3/40
See application file for complete search history.

(56) References Cited

U.S. PATENT DOCUMENTS

| | | | |
|---|---|---|---|
| 9,245,326 | B2 | 1/2016 | Salvador et al. |
| 9,384,204 | B2 | 7/2016 | Gupta |
| 9,478,007 | B2 | 10/2016 | Yang et al. |
| 9,508,025 | B2 | 11/2016 | Senda et al. |
| 9,965,832 | B2 | 5/2018 | Marcos et al. |
| 10,043,242 | B2 | 8/2018 | Matson et al. |
| 10,181,092 | B2 | 1/2019 | Shao et al. |
| 10,540,749 | B2 | 1/2020 | Cansizoglu |
| 10,579,908 | B2 | 3/2020 | Chen |
| 10,769,761 | B2 | 9/2020 | Sharma et al. |
| 10,855,966 | B2 | 12/2020 | Chaudhuri et al. |
| 11,055,819 | B1 | 7/2021 | Singh |

(Continued)

FOREIGN PATENT DOCUMENTS

| | | |
|---|---|---|
| AU | 2021101762 A4 | 5/2021 |
| EP | 3105736 A1 | 2/2016 |

(Continued)

OTHER PUBLICATIONS

Saeed Anwar et al.; "Densely Residual Laplacian Super-Resolution";arXiv:1906.12021v2 [eess.IV]; Jul. 1, 2019. (Year: 2019).*

Zhang, Yulun, et al. "Residual Dense Network for Image Super-Resolution." 2018 IEEE/CVF Conference on Computer Vision and Pattern Recognition. IEEE, 2018. (Year: 2018).*

(Continued)

*Primary Examiner* — Geoffrey E Summers
(74) *Attorney, Agent, or Firm* — DLA Piper LLP (US)

(57) ABSTRACT

A deep learning network can have the following elements arranged in sequence: a convolutional block, a first residual block (RB), a first element-wise adder, a second RB, a second element-wise adder, and an upsampling unit. At least one processor can perform processing comprising generating a super resolution image by processing, with the deep learning network, an image having a resolution lower than a resolution of the super resolution image.

15 Claims, 13 Drawing Sheets

(56) References Cited

U.S. PATENT DOCUMENTS

| | | |
|---|---|---|
| 2017/0316548 A1 | 11/2017 | Zhang |
| 2019/0045168 A1 | 2/2019 | Chaudhuri et al. |
| 2019/0180146 A1 | 6/2019 | Sacheti et al. |
| 2019/0188535 A1 | 6/2019 | Chen |
| 2019/0304063 A1 | 10/2019 | Cansizoglu |
| 2020/0162715 A1 | 5/2020 | Chaudhuri et al. |
| 2020/0356810 A1 | 11/2020 | Zhong |
| 2021/0065337 A1 | 3/2021 | Bai |

FOREIGN PATENT DOCUMENTS

| | | |
|---|---|---|
| KR | 102245501 B1 | 4/2021 |
| WO | WO 2015/121422 | 8/2015 |

OTHER PUBLICATIONS

Lim, Bee, et al. "Enhanced deep residual networks for single image super-resolution." Proceedings of the IEEE conference on computer vision and pattern recognition workshops. 2017. (Year: 2017).*

Wang, Xintao, et al. "ESRGAN: Enhanced Super-Resolution Generative Adversarial Networks." European Conference on Computer Vision. 2018. (Year: 2018).*

Saeed Anwar et al.; "Densely Residual Laplacian Super-Resolution";arXiv:1906.12021v2 [eess.IV]; Jul. 1, 2019.

International Search Report and Written Opinion for Application No. PCT/182024/051124, mailed on May 2, 2024, 18 pages.

Lai W., et al., "Deep Laplacian Pyramid Networks for Fast and Accurate Super-Resolution," 2017 IEEE Conference on Computer Vision and Pattern Recognition (CVPR), Jul. 21-26, 2017, pp. 5835-5843.

* cited by examiner

INPUT = PIXELATED IMAGE

OUTPUT = CLEAR NON PIXELATED IMAGE 35-37

INPUT = PIXELATED IMAGE

OUTPUT = CLEAR NON-PIXELATED IMAGE

PRIOR ART

SYSTEMS AND METHODS OF OPTIMIZED DEEP LEARNING FOR IMAGE RECONSTRUCTION

BACKGROUND

A convolutional neural network approach has been used for the reconstruction of highly accurate super-resolution images. The method utilizes densely connected residual blocks along with a Laplacian attention network for accurate image super-resolution.

An example of a baseline system for reconstructing highly accurate super-resolution images is shown in FIG. 12. The illustrated system includes a convolutional block 11, multiple residual blocks (RBs) 12-17, an upsampling unit 115, and plurality of element-wise adders 18, 19, 110, 111, 112, 113 and 114. The network model performs four functions, namely, feature extraction, cascading over residual on the residual, upsampling and reconstruction. The low-resolution input image is applied to the convolutional block 11 to extract primitive features. The extracted primitive features are then processed through the serially connected residual blocks 12-17 with medium skip-connections (MSC) which collectively perform the cascading over residual on the residual, followed by upsampling by 115. This system is effective, but requires a large number of residual blocks and subcomponents thereof, and therefore can be computationally inefficient and expensive to build and operate.

BRIEF DESCRIPTION OF THE DRAWINGS

The accompanying figures, which are incorporated herein, form part of the specifications and illustrate disclosed embodiments. Together with the description, the figures further explain the principles of the present disclosure and enable a person skilled in the relevant art to make and use the embodiments described herein.

FIG. 9 shows a comparison plot of the average testing times vs the performance of the present embodiments and a baseline model for different upsampling rates.

FIG. 12 shows a block diagram of a baseline model prior art architecture.

Similar reference characters denote corresponding features consistently throughout the attached drawings.

DETAILED DESCRIPTION OF SEVERAL EMBODIMENTS

Figure 1:
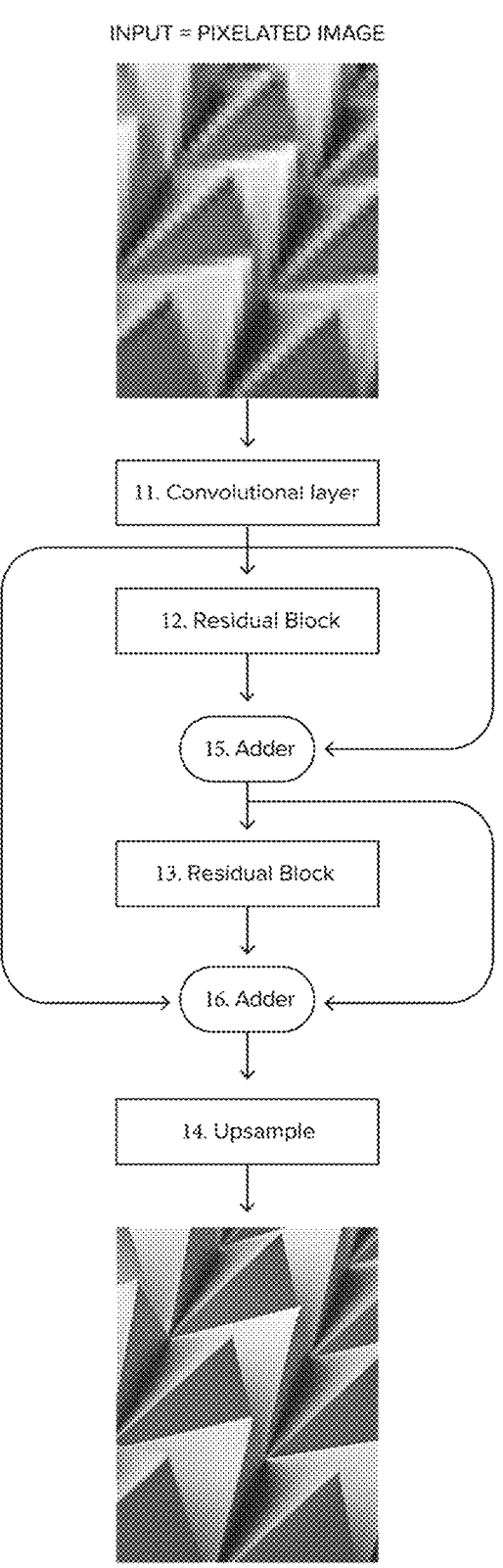
FIG. 1 is a block diagram of the proposed system architecture according to some embodiments of the disclosure.

The embodiments described herein relate to the domain of computer image processing and/or reconstruction and artificial intelligence technology, particularly associated with the utilization of deep learning models for super-resolution image reconstruction.

For example, a computationally simple deep learning-based method for reconstructing super-resolution images from low resolution input images is described. Embodiments disclosed herein may employ a reconstruction process based on optimally calculated, serially connected, residual computational blocks executing Laplacian deep super-resolution models with integrated compression and convolutional units, resulting in the super-resolution reconstructed image to be clearer, less computationally complex, and with higher reconstruction speeds. The disclosed method skillfully reduces the structural complexity of the conventional baseline model by carefully reducing the number of residual blocks, the feature maps, and the complexity of residual units while assuring the output image results remain acceptably good.

Systems and methods described herein may utilize a modular convolutional neural network approach for the reconstruction of highly accurate super-resolution images. Such embodiments may utilize densely connected residual blocks along with a Laplacian attention network for accurate image super-resolution.

An example implementation may constitute at least four components namely, feature extraction, cascading over residual on the residual, up sampling, and reconstruction. The feature extraction layer further comprises of a single convolutional layer with the aim of extracting primitive features from the low-resolution input image. The residual on the residual component comprises of multiple dense residual Laplacian modules (DRLM) cascaded together which take the extracted primitive features as input and produce the estimated features. The extracted features are then upsampled using an upsampling operator, which can be a deconvolutional layer, a nearest-neighbor upsampling with convolution, or in some embodiments, an efficient sub-pixel convolutional neural network (ESPCN). The upsampled features are passed through the reconstruction component to predict the super-resolved RGB color channels as output.

Starting from the baseline configuration (e.g., see FIG. 12), an optimization process to significantly reduce the number of DRLMs, the convolutional layers, and other essential blocks, provides a super-resolution system with minimum structural complexity and acceptable hardware processing requirements, while having no noticeable effect on the reconstructed images. For example, a baseline configuration has 6 residual blocks, 20 DRLMs, 64 feature maps, and residual units each respectively having 2 convolutional layers and 2 rectified linear unit layers; whereas an optimized system can have 2 residual blocks, 12 DRLMs, 32 feature maps, and residual units each respectively having 1 convolutional layer and 1 rectified linear unit layer. For a 320×240 and 720×480 resolution input images, the disclosed system and methods result in inference time reduction by half, consumed memory reduction by a factor of 4, and for input image resolutions of 1920×1080 and 3840×2160, corresponding consumed memory reduces by a factor of 6.

Other systems, configurations, and methods according to the exemplary embodiments will become apparent to one with ordinary skill in the art upon review of the following drawings and detailed description. It is intended that all such additional systems, configurations and methods be considered within this description, be within the scope of the claimed features, and be protected by the presented claims.

Subject matter will now be described fully hereinafter with reference to the accompanying drawings, which form a part hereof, and which show, by way of illustration, specific exemplary embodiments, and performance metrics. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonable broad scope for claimed or covered subject matter is intended. Among other things, for example, the subject matter may be embodied as methods, devices, components, or systems. The following detailed description is, therefore, not intended to be taken in a limiting sense.

The word "exemplary" is used herein to mean "serving as an example, instance, or illustration". Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein is for the purpose of describing specific embodiments only and is not intended to be limiting of all possible embodiments. As used herein, the singular forms "a", "an", and "the" are intended to include the plural forms as well, unless the context indicates otherwise. It will be further understood that the terms "comprises", "comprising", "constitutes", "constituting", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the disclosed systems and methods. The description is not to be taken in a limiting sense but is made merely for the purpose of illustrating the general principles of the disclosed systems and methods, since the scope of the invention will be best defined by the claims.

The block diagram of the proposed solution network architecture is shown in FIG. 1. The system comprises of a convolutional block 11, at least two residual blocks (RBs) 12-13, an upsampling unit 14 and at least two element-wise adders 15-16. The network model performs four functions, namely, feature extraction, cascading over residual on the residual, upsampling and reconstruction. The low-resolution input image is applied to the convolutional block 11 to extract primitive features. The convolutional block 11 not only extracts primitive features, but also helps in reducing data dimensionality and producing less redundant data sets, also called feature maps. Mathematically, considering the low-resolution input image as x, the extracted primitive features $f_0$ can be attained by the feature extraction operation comprising of one convolutional block as:

$$f_0 = H_f(x) \qquad (1)$$

Where $H_f(\cdot)$ is the convolutional operator applied on the low−resolution input image.

The extracted primitive features $f_0$ are then processed through the serially connected RBs 12-13 with medium skip-connections (MSC) which collectively perform the cascading over residual on the residual function. Mathematically, the estimated features $f_r$ are attained after processing $f_0$ through the $H_{crir}(\cdot)$, the main cascading residual on the residual component, as:

$$f_r = H_{crir}(f_0) \qquad (2)$$

Following the processing of deep features $f_r$, the deep features are upsampled by the upsampling unit 14. By definition, upsampling increasing the image resolution by including additional pixels based on interpolating using the existing data. Mathematically, the upsampled features $f_u$ after passing through an upsampling operator $H_u(\cdot)$ can be expressed as:

$$f_u = H_u(f_r) \qquad (3)$$

Multiple algorithms including deconvolutional layer and nearest-neighbor upsampling with convolution exist in literature and can be employed as the upsampling operator $H_u(\cdot)$. For some embodiments, the Efficient Sub-pixel Convolutional Neural Network (EPCN) has been utilized as the upsampling operator at 14, owing to its lesser computational complexity.

Finally, the upsampled features $f_u$ are passed through the reconstruction operator $H_r(f_u)$ to predict the super-resolved RGB color channels at the output, as:

$$\hat{y} = H_r(f_u) \qquad (4)$$

Where $\hat{y}$ is the estimated super resolution image.

Figure 2:
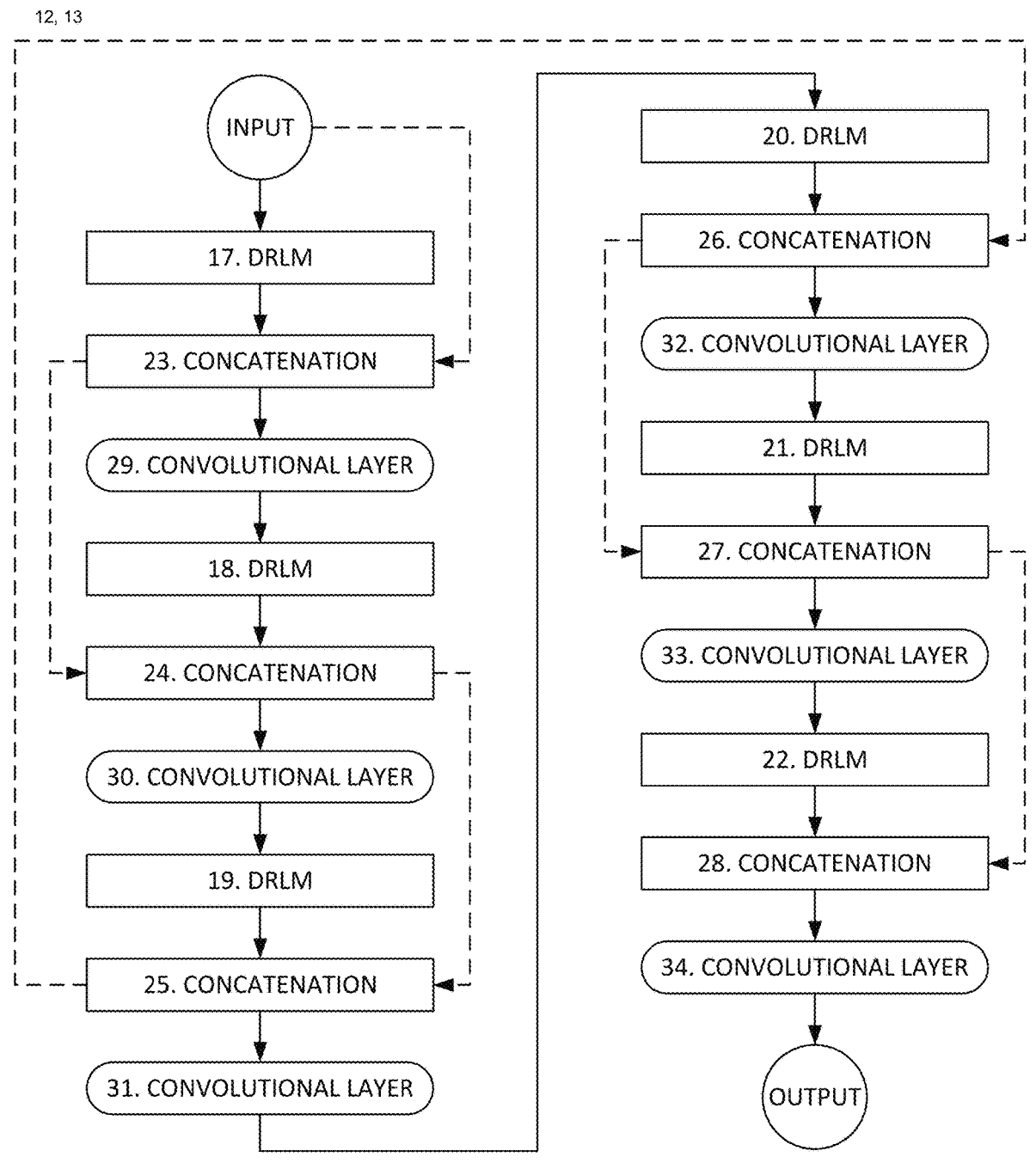
FIG. 2 is a block diagram of the residual block (RB) according to some embodiments of the disclosure.

FIG. 2 shows the block diagram of an individual RB (12-13 of FIG. 1). Each RB 12-13 consists of serially connected six dense residual Laplacian modules (DRLM) 17-22, six concatenation modules 23-28, and six convolutional units 29-34. With each RB 12-13 composed of six DRLMs 17-22, the input to the next RB is computed as indicated in the structural block diagram of FIG. 2 (output).

The six concatenation modules 23-28 simply append the output of the respective DRLM 17-22.

Figure 3:
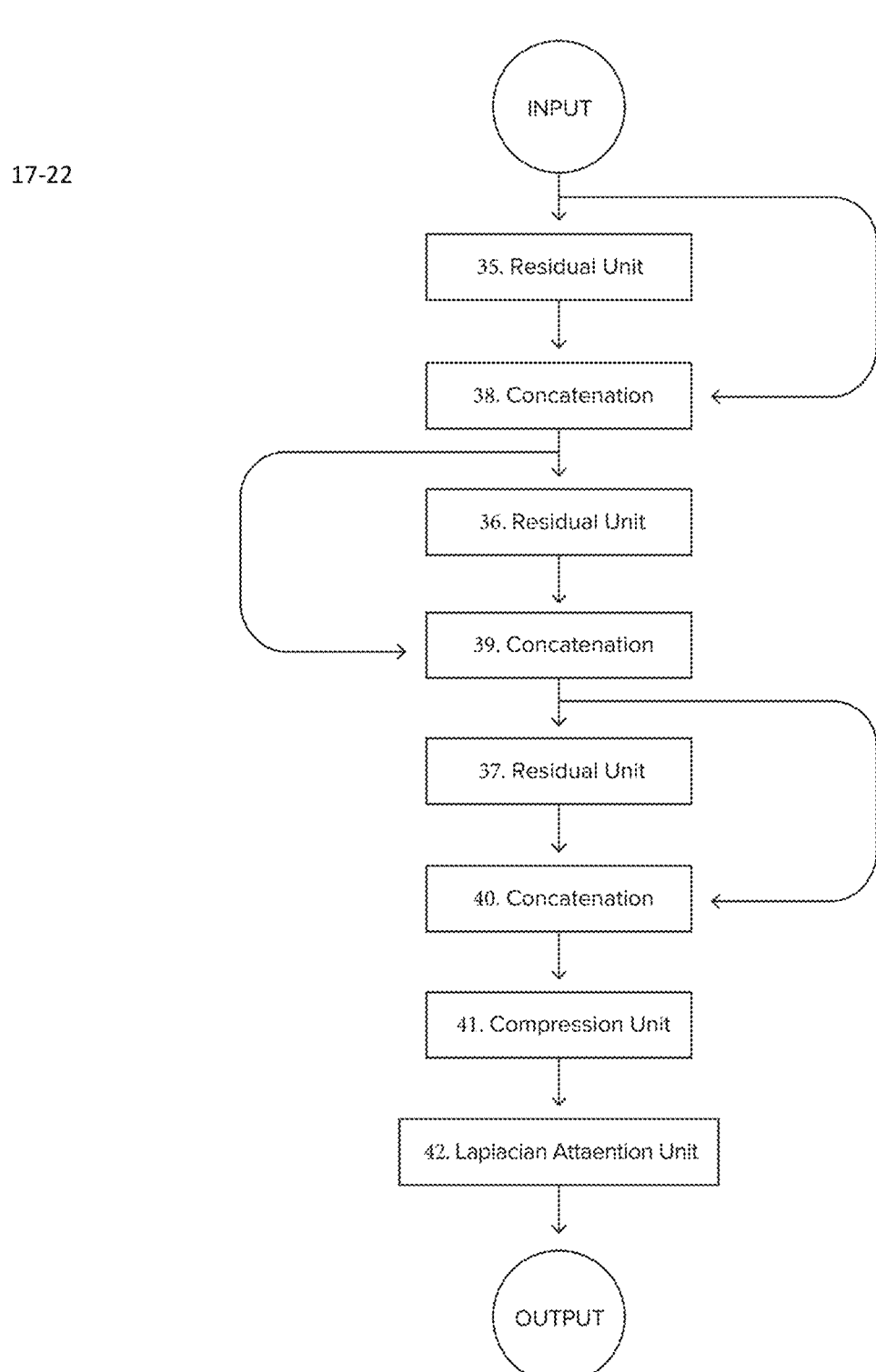
FIG. 3 is a block diagram of the dense residual Laplacian modules (DRLM) according to some embodiments of the disclosure.
Figure 4:
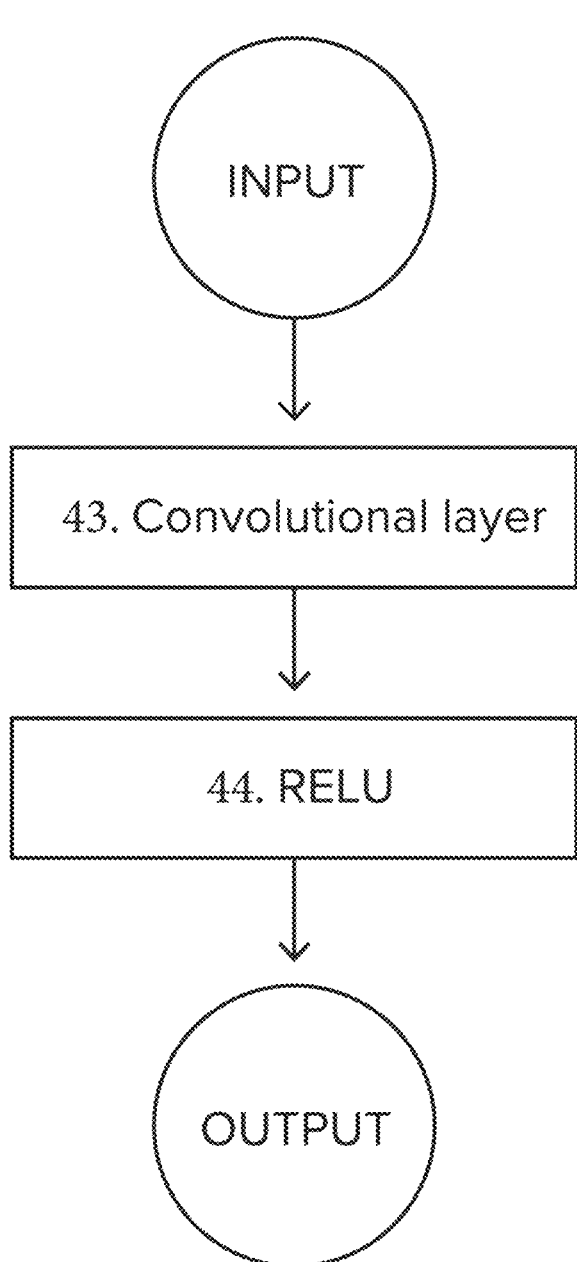
FIG. 4 is a block diagram of the residual unit (RU) according to some embodiments of the disclosure.

The architecture of the DRLM 17-22 is shown in FIG. 3. Each DRLM 17-22 consists of four main subcomponents: residual units (RUs) 35-37, concatenation units 38-40, a compression unit 41, and a Laplacian attention unit 42. The RUs 35-37 each include one convolutional layer 43, and one rectified linear unit (ReLU) 44, as shown in FIG. 4. The output of the RUs 35-37 are passed through a compression unit 41 to compress the high number of parameters resulting from the dense concatenation done by units 38-40. The compressed features are then forwarded to the Laplacian attention unit 42 which boosts and exploits the relationship between specific features considered essential for super-resolution conversion of the input image. To produce attention differently at the Laplacian pyramids in the DRLM, a global descriptor has been utilized to capture the statistics of the entire image. The global descriptor takes the compressed features f c with size h×w with c feature maps, and reduces the size to 1×1×c as:

$$g_d = \frac{1}{h \times w} \sum_{i=1}^{h} \sum_{j=1}^{w} f_c(i, j) \tag{7}$$

Where $f_c(i, j)$ is the value at position $(i, j)$ of the feature maps.

In order to capture the channel dependencies from $g_d$, a gating approach has been adopted. Formal implementation of the gating approach has been done using multiple ReLUs and sigmoid functions, denoted by $\tau$, and $\sigma$, respectively. The $g_d$ features are then passed through the Laplacian pyramid to learn the critical features at different scales as:

$$r_3 = \tau\left(D_{f_3}(g_d)\right), \tag{8}$$

$$r_5 = \tau\left(D_{f_5}(g_d)\right),$$

$$r_7 = \tau\left(D_{f_7}(g_d)\right),$$

Where $D(\cdot)$ is the function reduction operator, $f$ are the convolutional layers and $r$ represents the multilevel representations The multi-level representations $r_3$, $r_5$ and $r_7$ obtained from the global descriptor $g_d$ are concatenated as:

$$g_p = [r_3; r_5; r_7] \tag{9}$$

To upsample and differentiate between the feature maps, the output is upsampled through $U_f(\cdot)$, followed by sigmoid activation as:

$$L_P = \sigma(U_f(g_p)) \tag{10}$$

6

Finally the learned statistics are utilized by adaptively rescaling the output of the sigmoid function as:

$$\hat{f}_c = L_P \times f_c \tag{11}$$

Figure 5:
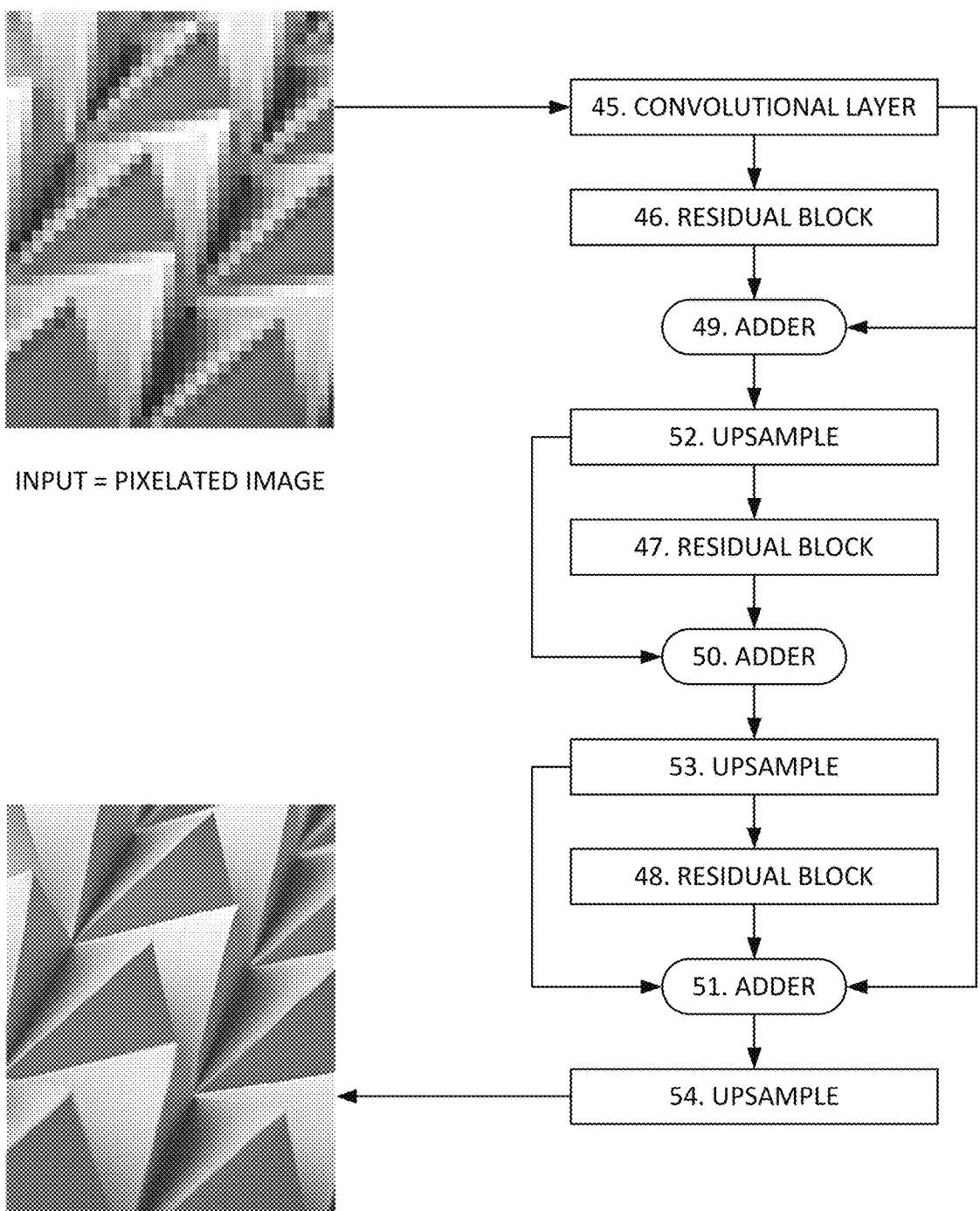
FIG. 5 is a block diagram of a system architecture according to some embodiments of the disclosure.

Other embodiments are possible, FIG. 5, where an extra RB 48. is added, as well as 2 upsamplers 52-53 are added after their respective adders units 49-50 and an extra adder 51 is in between the last RB 48 and the last upsampler 54.

Figure 6:
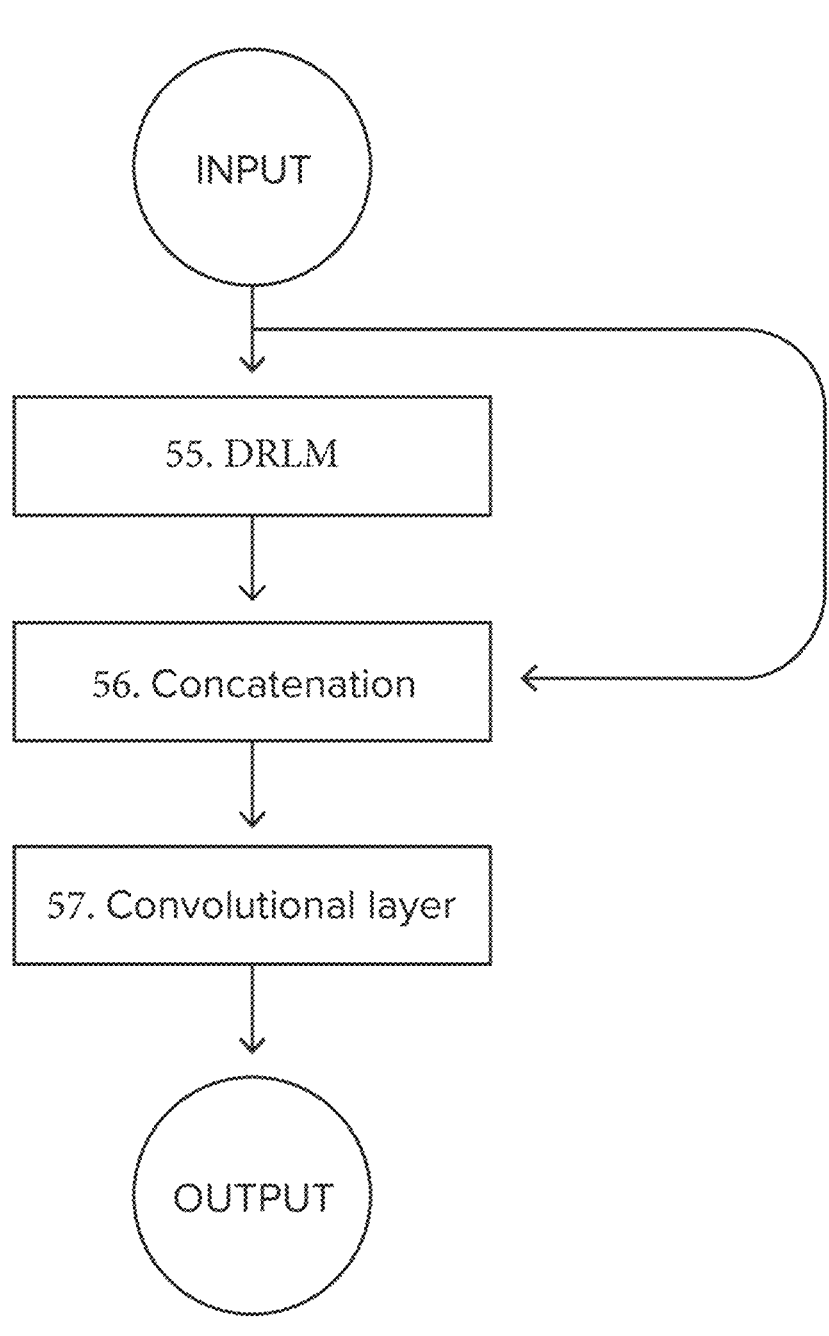
FIG. 6 is a block diagram of the residual block (RB) according to some embodiments of the disclosure.
Figure 7:
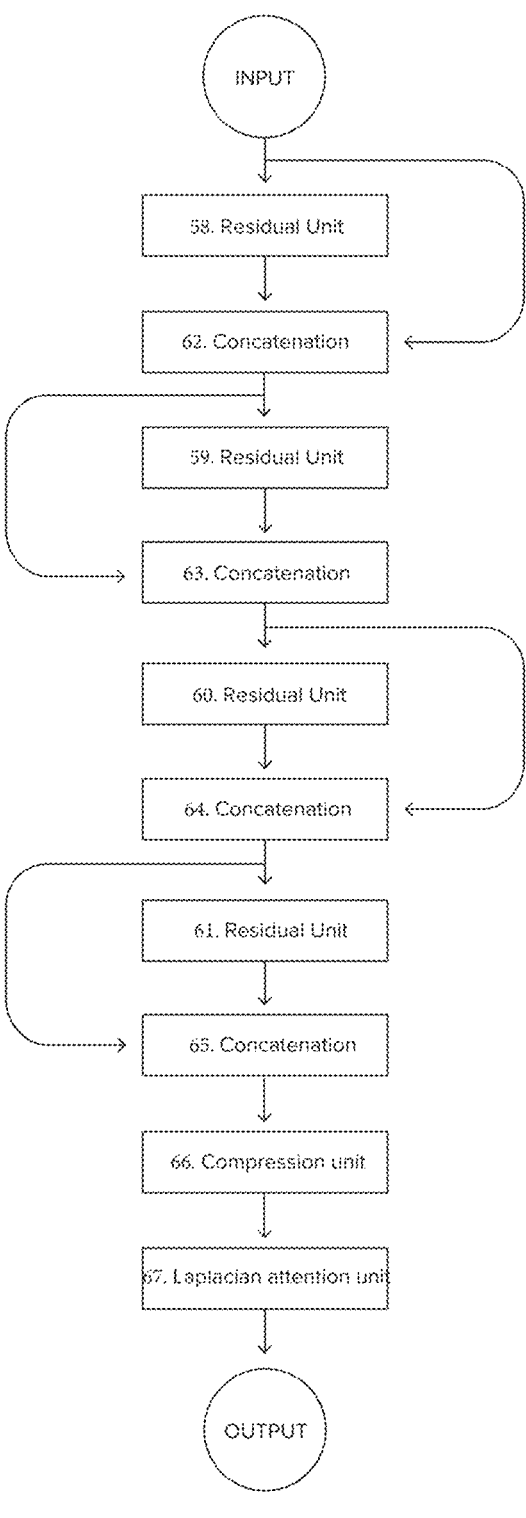
FIG. 7 is a block diagram of the dense residual Laplacian modules (DRLM) according to some embodiments of the disclosure.
Figure 8:
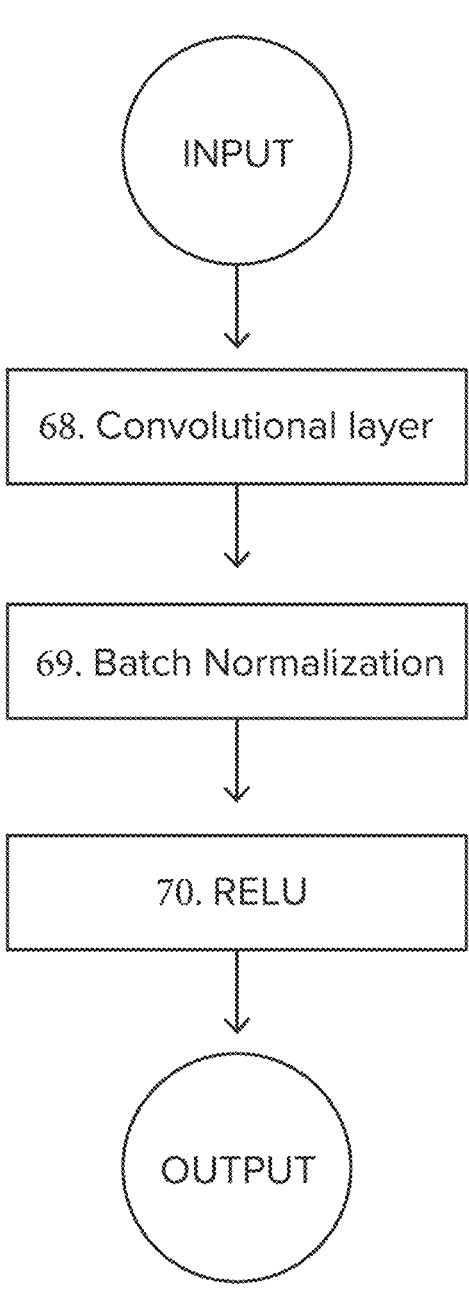
FIG. 8 is a block diagram of the residual unit (RU) according to some embodiments of the disclosure.

In an alternative embodiment, the RBs 46-48 can be simplified, for example as shown in FIG. 6. The simplified RBs can be configured to have one DRLM 55, one concatenation unit 56 and one convolutional layer 57. In another alternative embodiment the DRLM 55 can have one more RU 61 and one more concatenation layer 65, see FIG. 7. In another alternative embodiment the RU 61 can have added a batch normalization layer 69, as shown in FIG. 8.

The cascaded DRLM modules along with convolution, concatenation and compression operations require high computational powers as well as increase the processing times of the super-resolution conversion process. To optimize the network architecture of FIG. 1, several combinations of the basic network components were simulated to determine an optimum composition. URBAN100 and B100 benchmark data sets were used as input and the best performing model out of the proposed weight models was selected as highlighted by PSNR score, inference time and spatial complexity. The results of this simulation study are provided in Table. 1.

TABLE 1

| Model | Structural Changes | | | | | PSNR Score (dB) | | Avg. Runtime (s) | | GPU Memory (MiB) | | | |
|---|---|---|---|---|---|---|---|---|---|---|---|---|---|
| | RB | DRLM | RU | HFL | FM | U100 | B100 | U100 | B100 | Res. 1 | Res. 2 | Res. 3 | Res. 4 |
| BM | 6 | 20 | 3 | 2 | 64 | 32.603 | 32.262 | 2.83 | 1.1 | 2039 | 8035 | 12173.7 | 12173.7 |
| M1 | 6 | 20 | 2 | 2 | 64 | 32.2 | 32.2 | 2.04 | 0.52 | 1071 | 4320 | 6562 | 6562 |
| M2 | 4 | 12 | 3 | 2 | 64 | 32.388 | 32.201 | 2.47 | 0.97 | 1233 | 4867 | 7375 | 7375 |
| M3 | 6 | 20 | 3 | 1 | 64 | 32.502 | 32.239 | 2.61 | 1.08 | 1182 | 4774 | 7253 | 7253 |
| M4 | 6 | 20 | 3 | 2 | 32 | 32.093 | 32.138 | 2.31 | 0.98 | 992.1 | 4026 | 6119 | 6119 |
| M5 | 4 | 12 | 3 | 2 | 32 | 32.185 | 32.074 | 1.57 | 0.46 | 365.5 | 1482 | 2252 | 2252 |
| M6 | 2 | 12 | 3 | 2 | 64 | 32.585 | 32.26 | 2.01 | 0.49 | 644 | 2585 | 3925 | 3925 |
| M7 | 2 | 12 | 3 | 1 | 32 | 31.893 | 32.097 | 1.64 | 0.48 | 366.1 | 1483 | 2253 | 2253 |
| M8 | 3 | 12 | 3 | 1 | 32 | 31.867 | 32.075 | 1.60 | 0.48 | 366 | 1483 | 2253 | 2253 |

As evident from Table 1, Model 7 (M7) provides the best trade-off between PSNR and memory complexity along with lesser computational costs, and hence is selected as the optimum model.

By varying the upsampling rates of the optimized model, the PSNR values have been compared with the baseline and presented in Table 2.

TABLE 2

| Dataset | Scale | Baseline | Selected |
|---|---|---|---|
| B100 | 2× | 32.262 | 32.097 |
| Urban100 | | 32.603 | 31.893 |
| B100 | 3× | 29.074 | 29.018 |
| Urban100 | | 28.274 | 27.941 |
| B100 | 4× | 27.697 | 27.545 |

TABLE 2-continued

| Dataset | Scale | Baseline | Selected |
|---------|-------|----------|----------|
| Urban100 | | 26.624 | 26.034 |
| B100 | 8× | 24.794 | 24.686 |
| Urban100 | | 22.513 | 22.208 |

Figure 9:
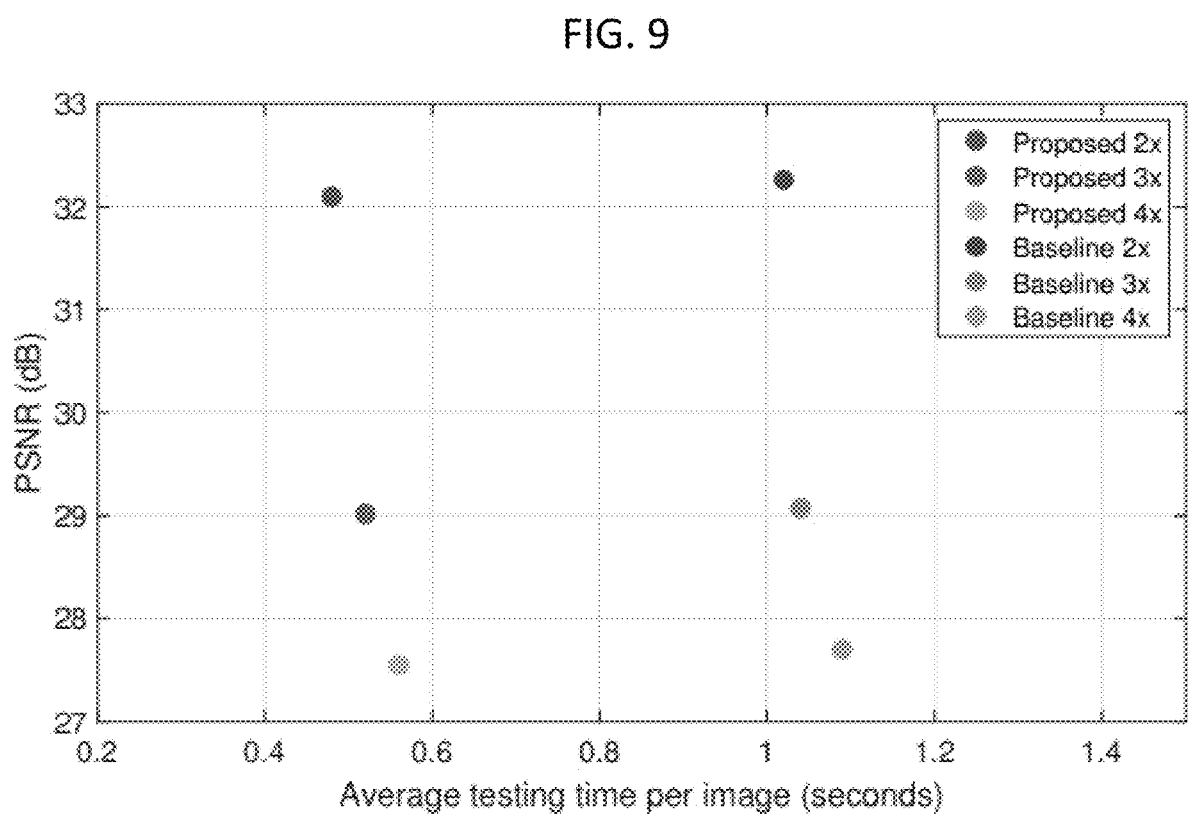
Figure 10:
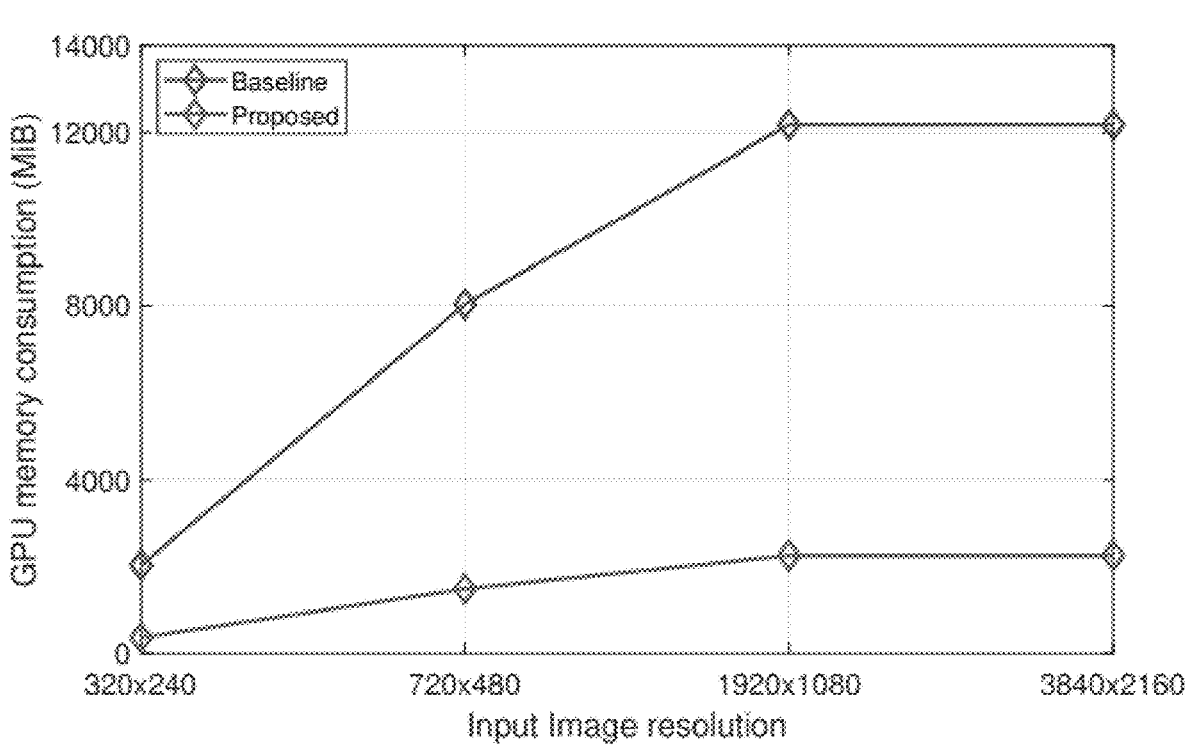
FIG. 10 depicts a comparison of the input image resolution and the corresponding GPU memory consumption for the present embodiments and the a model.

As observed from Table 2, the PSNR values of the present embodiment are comparable to the baseline. A view of the inference times for the present embodiment as well as the baseline model for B100 dataset at different upsampling rates is provided in FIG. 9. As observed, the inference time of the present embodiment is reduced by half for all the sampling rates. The GPU memory consumption comparison between the baseline model and the present invention in FIG. 10 clearly indicates that for input image resolutions of 320×240 and 720×480 the memory utilization reduces by a factor of 4, whereas for input image resolutions of 1920×1080 and 3840×2160, a memory consumption reduction by a factor of 6 is noticed.

Figure 11:
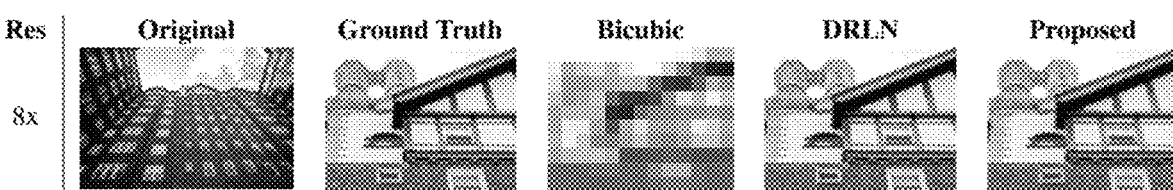
FIG. 11 shows the visual comparison of the present embodiments and a baseline model for reconstructed images with an upsampling rate of 8×.
Figure 12:
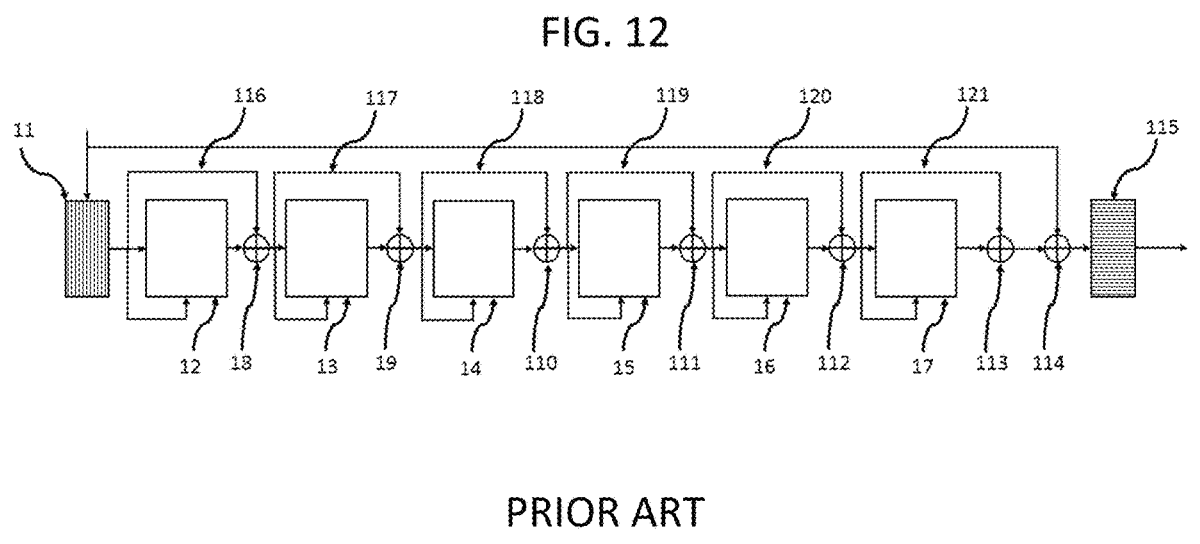

A qualitative comparison of the reconstructed super resolution images presented in FIG. 11 shows that the present embodiment provides visually similar result to the baseline (e.g., as shown in FIG. 12) while being less computationally complex and memory demanding. In particular, by performing an analysis of the single components, it is easy to observe the structural complexity reduction for the simplified models. RB is the main component of DRLN. If one RB is removed, the structural complexity of DRLN is reduced to ⅙. Removing the RB also reduces medium skip connections of the model. DRLM is the principal component of the RB. Removing one DRLM module from an RB reduces the structural complexity of the block by ⅓ for the first 4 residual blocks and ¼ for the last 2 RBs, and the number of dense connections in the whole network is also reduced. RU is the building block of DRLM. Removing one RU from a DRLM reduces the structural complexity of the module by ⅓ and also reduces the number of dense connections in the whole network. Hidden Convolutional Layers (HL) are the basic building blocks of DRLN. By removing one convolutional layer from each residual unit, the structural complexity of a residual unit is reduced by half. The number of input features maps impacts the overall complexity and performance of the network. By reducing the number of feature maps by half, the memory consumption of the whole network can be reduced. Based on the above analysis, the embodiments described herein clearly represent a reduction in complexity. Note, however, that the choice of specific components removed, and the arrangement of the remaining components, should be made as described above in order to achieve the performance described above. That is, it is not enough to merely remove components, but such removal and rearrangement must be carefully considered.

Figure 13:
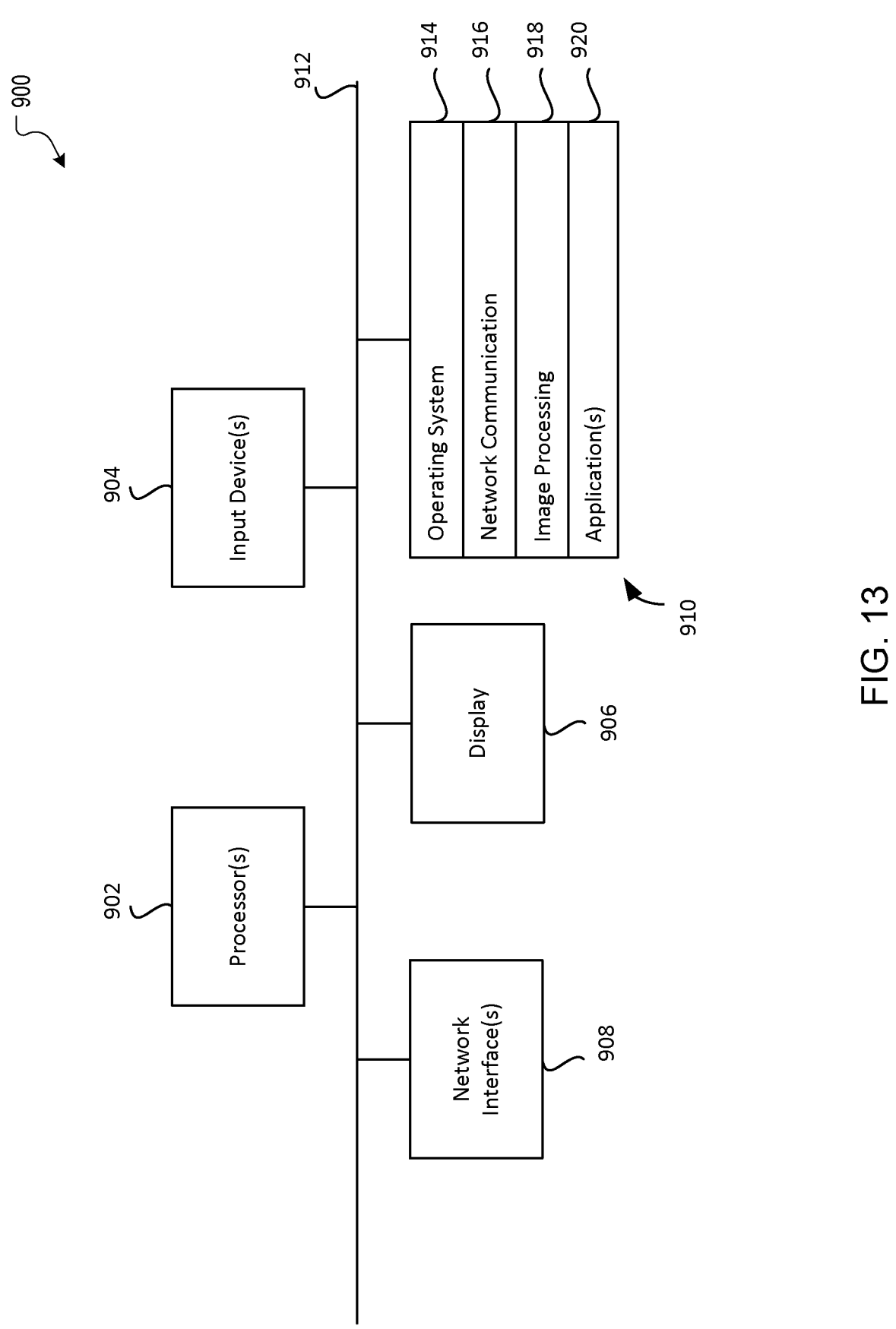
FIG. 13 shows an example computing device according to some embodiments.

FIG. 13 shows a computing device 900 according to some embodiments of the disclosure. For example, computing device 900 may operate and/or execute any of the above-described embodiments.

Computing device 900 may be implemented on any electronic device that runs software applications derived from compiled instructions, including without limitation personal computers, servers, smart phones, media players, electronic tablets, game consoles, email devices, etc. In some implementations, computing device 900 may include one or more processors 902, one or more input devices 904, one or more display devices 906, one or more network interfaces 908, and one or more computer-readable mediums 910. Each of these components may be coupled by bus 912, and in some embodiments, these components may be distributed among multiple physical locations and coupled by a network.

Display device 906 may be any known display technology, including but not limited to display devices using Liquid Crystal Display (LCD) or Light Emitting Diode (LED) technology. Processor(s) 902 may use any known processor technology, including but not limited to graphics processors and multi-core processors. Input device 904 may be any known input device technology, including but not limited to a keyboard (including a virtual keyboard), mouse, track ball, and touch-sensitive pad or display. Bus 912 may be any known internal or external bus technology, including but not limited to ISA, EISA, PCI, PCI Express, NuBus, USB, Serial ATA or FireWire. In some embodiments, some or all devices shown as coupled by bus 912 may not be coupled to one another by a physical bus, but by a network connection, for example. Computer-readable medium 910 may be any medium that participates in providing instructions to processor(s) 902 for execution, including without limitation, non-volatile storage media (e.g., optical disks, magnetic disks, flash drives, etc.), or volatile media (e.g., SDRAM, ROM, etc.).

Computer-readable medium 910 may include various instructions 914 for implementing an operating system (e.g., Mac OS®, Windows®, Linux). The operating system may be multi-user, multiprocessing, multitasking, multithreading, real-time, and the like. The operating system may perform basic tasks, including but not limited to: recognizing input from input device 904; sending output to display device 906; keeping track of files and directories on computer-readable medium 910; controlling peripheral devices (e.g., disk drives, printers, etc.) which can be controlled directly or through an I/O controller; and managing traffic on bus 912. Network communications instructions 916 may establish and maintain network connections (e.g., software for implementing communication protocols, such as TCP/IP, HTTP, Ethernet, telephony, etc.).

Image processing 918 may include the system elements and/or the instructions that enable computing device 900 to perform the processing as described above, for example using the above-described neural network configurations to reconstruct super-resolution images according to the embodiments disclosed herein. Application(s) 920 may be an application that uses or implements the outcome of processes described herein and/or other processes. For example, application(s) 920 may incorporate the super resolution processing described above and/or may utilize images produced by the super resolution processing. In some embodiments, the various processes may also be implemented in operating system 914.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java, Python/Pythorch, etc.), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as an LED or LCD monitor for displaying information to the user and a keyboard and a pointing device such as a mouse or a trackball by which the user can provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination thereof. The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API and/or SDK, in addition to those functions specifically described above as being implemented using an API and/or SDK. An API may define one or more parameters that are passed between a calling application and other software code (e.g., an operating system, library routine, function) that provides a service, that provides data, or that performs an operation or a computation. SDKs can include APIs (or multiple APIs), integrated development environments (IDEs), documentation, libraries, code samples, and other utilities.

The API and/or SDK may be implemented as one or more calls in program code that send or receive one or more parameters through a parameter list or other structure based on a call convention defined in an API and/or SDK specification document. A parameter may be a constant, a key, a data structure, an object, an object class, a variable, a data type, a pointer, an array, a list, or another call. API and/or SDK calls and parameters may be implemented in any programming language. The programming language may define the vocabulary and calling convention that a programmer will employ to access functions supporting the API and/or SDK.

In some implementations, an API and/or SDK call may report to an application the capabilities of a device running the application, such as input capability, output capability, processing capability, power capability, communications capability, etc.

It is to be understood that the present invention is not limited to the embodiments described above but encompasses any and all embodiments within the scope of the following claims.

What is claimed is:

1. A system comprising:
   at least one processor; and
   at least one non-transitory computer-readable medium storing:
      a deep learning network having the following elements arranged in sequence:
         a convolutional block,
         a first residual block (RB),
         a first element-wise adder,
         a second RB,
         a second element-wise adder, and
         an upsampling layer; and
      instructions that, when executed by the at least one processor, cause the at least one processor to perform processing comprising generating a super resolution image by processing, with the deep learning network, an image having a resolution lower than a resolution of the super resolution image,
   wherein each of the first RB and the second RB respectively includes six serially connected dense residual Laplacian modules (DRLMs), six concatenation modules, and six convolutional units,
   wherein each DRLM respectively includes one or more residual units (RUs), one or more concatenation units, one or more compression units, and one or more Laplacian attention units, and
   wherein each RU respectively includes one and only one convolutional layer and one and only one rectified linear unit.

2. The system of claim 1, wherein each DRLM is configured to perform processing comprising:
   obtaining a residual;
   performing dense concatenation;
   compressing parameters from the dense concatenation; and
   performing Laplacian attention processing.

3. The system of claim 1, wherein the processing comprises:
   performing feature extraction;
   performing cascading over residual on a residual;
   performing upsampling; and
   performing reconstruction.

4. The system of claim 3, wherein the feature extraction comprises processing by the convolutional block.

5. The system of claim 3, wherein the cascading over residual on the residual comprises processing through the first RB and second RB with medium skip-connections.

6. The system of claim 3, wherein the upsampling comprises processing by the upsampling layer to increase the resolution of the image by including additional pixels based on interpolating using existing data.

7. The system of claim 1, wherein a number of feature maps in all the convolutional layers of the deep learning network is thirty two.

8. The system of claim 1, wherein a number of residual blocks in the deep learning network is two.

9. The system of claim 1, wherein each RU does not include an adder.

10. A method comprising:

provisioning, by at least one processor, a deep learning network having the following elements arranged in sequence:

a convolutional block, a first residual block (RB), a first element-wise adder, a second RB, a second element-wise adder, and an upsampling layer; and generating, by the at least one processor, a super resolution image by processing, with the deep learning network, an image having a resolution lower than a resolution of the super resolution image, wherein each of the first RB and the second RB respectively includes six serially connected dense residual Laplacian modules (DRLMs), six concatenation modules, and six convolutional units, wherein each DRLM respectively includes one or more residual units (RUs), one or more concatenation units, one or more compression units, and one or more Laplacian attention units, and wherein each RU respectively includes one and only one convolutional layer and one and only one rectified linear unit.

11. The method of claim 10, wherein each DRLM performs processing comprising:

obtaining a residual;

performing dense concatenation;

compressing parameters from the dense concatenation; and performing Laplacian attention processing.

12. The method of claim 10, wherein the processing comprises:

performing feature extraction;

performing cascading over residual on a residual;

performing upsampling; and performing reconstruction.

13. The method of claim 12, wherein the feature extraction comprises processing by the convolutional block.

14. The method of claim 12, wherein the cascading over residual on the residual comprises processing through the first RB and second RB with medium skip-connections.

15. The method of claim 12, wherein the upsampling comprises processing by the upsampling layer to increase the resolution of the image by including additional pixels based on interpolating using existing data.

* * * * *